United States Patent
Wang et al.

(10) Patent No.: US 12,027,673 B2
(45) Date of Patent: Jul. 2, 2024

(54) ELECTRODE ASSEMBLY MANUFACTURING DEVICE

(71) Applicant: CONTEMPORARY AMPEREX TECHNOLOGY CO., LIMITED, Ningde (CN)

(72) Inventors: Yiruo Wang, Ningde (CN); Zhiyang Wu, Ningde (CN); Gang Lin, Ningde (CN); Chao Xie, Ningde (CN); Guoda Huang, Ningde (CN); Yongli Zhang, Ningde (CN); Mingjian Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/326,350

(22) Filed: May 31, 2023

(65) Prior Publication Data

US 2023/0307718 A1    Sep. 28, 2023

Related U.S. Application Data (63) Continuation of application No. PCT/CN2022/096919, filed on Jun. 2, 2022.

(30) Foreign Application Priority Data

Sep. 23, 2021    (CN) .......................... 202122301716.3

(51) Int. Cl.
*H01M 10/0587* (2010.01)

(52) U.S. Cl.
CPC .............................. *H01M 10/0587* (2013.01)

(58) Field of Classification Search
CPC ................................................. H01M 10/0587
(Continued)

(56) References Cited

U.S. PATENT DOCUMENTS

| 2006/0073380 A1* | 4/2006 | Kim | H01M 10/0587 |
| | | | 29/623.1 |
| 2006/0267550 A1* | 11/2006 | Haraguchi | H01M 10/42 |
| | | | 320/112 |

(Continued)

FOREIGN PATENT DOCUMENTS

| CN | 206301895 U | 7/2017 |
| CN | 208000976 U | 10/2018 |

(Continued)

OTHER PUBLICATIONS

The World Intellectual Property Organization (WIPO) International Search Report for PCT/CN2022/096919 Aug. 5, 2022 7 pages (including English translation).

*Primary Examiner* — Jonathan G Jelsma
*Assistant Examiner* — Omar M Kekia
(74) *Attorney, Agent, or Firm* — ANOVA LAW GROUP, PLLC (57) ABSTRACT

An electrode assembly manufacturing device includes a winding mechanism, a heating mechanism, a conveyor belt arranged between the heating mechanism and the winding mechanism, and a forming mechanism. The winding mechanism is configured to wind a positive electrode sheet, a separator, and a negative electrode sheet into an electrode assembly. The conveyor belt is configured to transfer the electrode assembly from the winding mechanism to the heating mechanism. The heating mechanism is configured to heat the electrode assembly. The forming mechanism is configured to press and form the electrode assembly.

10 Claims, 2 Drawing Sheets

(58) Field of Classification Search
USPC .......................................................... 429/209
See application file for complete search history.

(56) References Cited

U.S. PATENT DOCUMENTS

| | | | | |
|---|---|---|---|---|
| 2008/0020253 | A1* | 1/2008 | Neubert | H01M 4/8896 |
| | | | | 429/534 |
| 2019/0363389 | A1* | 11/2019 | Ko | H01M 10/0463 |
| 2020/0106060 | A1* | 4/2020 | Shin | H01M 10/0422 |
| 2022/0123296 | A1* | 4/2022 | Ako | H01M 10/0587 |
| 2022/0263058 | A1* | 8/2022 | Woo | H01M 10/0587 |

FOREIGN PATENT DOCUMENTS

| | | |
|---|---|---|
| CN | 211045636 U | 7/2020 |
| CN | 111769335 A | 10/2020 |
| CN | 214226976 U | 9/2021 |
| CN | 216015471 U | 3/2022 |
| JP | 2009289661 A | 12/2009 |

* cited by examiner

ELECTRODE ASSEMBLY MANUFACTURING DEVICE

CROSS REFERENCE TO RELATED APPLICATIONS

The present application is a continuation of International Application No. PCT/CN2022/096919, filed on Jun. 2, 2022, which claims the priority of Chinese Patent Application No. 202122301716.3 filed on Sep. 23, 2021, entitled "Electrode assembly manufacturing device", the disclosures of which are incorporated herein by reference in their entirety.

TECHNICAL FIELD

Embodiments of the present application relates to the technical field of battery cell manufacturing equipment, and in particular to an electrode assembly manufacturing device.

BACKGROUND ART

In the production process of lithium batteries, a positive electrode sheet, a negative electrode sheet and a separator of a lithium battery need to be wound into an electrode assembly, and then the electrode assembly is preheated and cold pressed to finally obtain a finished battery cell. However, due to the limitations in design or structure of the existing winding machine, the winding machine is bulky and occupies a relatively large space. In addition, the electrode assembly needs to be transported by a mechanical gripper, which reduces the quality of the electrode assembly.

SUMMARY

In view of the above problems, an embodiment of the present application provides an electrode assembly manufacturing device, which is small in size, does not occupy a large space, and does not need to be transported by a mechanical gripper, thereby improving the quality of the electrode assembly.

In an aspect according to the embodiments of the present application, an electrode assembly manufacturing device is provided, including:
  a winding mechanism, configured to wind a positive electrode sheet, a separator and a negative electrode sheet into an electrode assembly;
  a heating mechanism, with a conveyor belt arranged between the heating mechanism and the winding mechanism, where the conveyor belt is configured to transfer the electrode assembly from the winding mechanism to the heating mechanism, and the heating mechanism is configured to heat the electrode assembly; and
  a forming mechanism, configured to press and form the electrode assembly.

In the above solution, the winding mechanism, the heating mechanism and the forming mechanism are integrated. On the one hand, the volume of the electrode assembly manufacturing device is effectively reduced, so it will not occupy a large space. On the other hand, the distance between the winding mechanism and the heating mechanism, and the distance between the heating mechanism and the forming mechanism are both reduced, so the transport path of the electrode assembly is shortened, thus improving the transport efficiency and manufacturing efficiency of the electrode assembly. In addition, a conveyor belt is provided between the heating mechanism and the winding mechanism, through which the electrode assembly can be directly transferred from the winding mechanism to the heating mechanism without the need for transfer by a mechanical gripper, so that the damage caused by the mechanical gripper to the electrode assembly is avoided, thus improving the quality of the electrode assembly.

In some embodiments, the heating mechanism includes two oppositely disposed electromagnetic heating assemblies. A gap for the electrode assembly to pass through is provided between the two electromagnetic heating assemblies. The electromagnetic heating assembly is configured to electromagnetically heat the electrode assembly.

In the above solution, the electrode assembly can be heated quickly and sufficiently by the electromagnetic heating assembly, which can improve the tightness of the bonding between the positive electrode sheet, the separator, and the negative electrode sheet in the electrode assembly, and ensure the consistency of the battery.

In some embodiments, the heating mechanism further includes a heating transport belt connected to the conveyor belt, and configured to transport the electrode assembly in the heating mechanism.

In the above solution, the heating transport belt in the heating mechanism is connected to the conveyor belt, and the electrode assembly heated by the heating mechanism can directly travel from the conveyor belt to the heating transport belt, and then the electrode assembly is transported in the heating mechanism through the heating transport belt. The electrode assembly can be heated during the transport process in the heating mechanism, and the heating efficiency is high.

In some embodiments, the heating transport belt runs at the same speed as the conveyor belt.

In the above solution, the running speed of the heating transport belt is the same as that of the conveyor belt, and the electrode assembly heated by the heating mechanism can travel smoothly from the conveyor belt to the heating transport belt, to prevent the stagnation or overturn of the electrode assembly when traveling from the conveyor belt to the heating transport belt.

In some embodiments, the heating transport belt is provided with a temperature sensor for sensing the temperature of the electrode assembly on the heating transport belt.

In the above solution, the temperature sensor provided on the heating transport belt can sense the temperature of the electrode assembly on the heating transport belt, so as to get to know the temperature of the electrode assembly in time.

In some embodiments, multiple temperature sensors are provided, and the multiple temperature sensors are distributed on the heating transport belt at intervals.

In the above solution, the temperature sensors are distributed at different positions on the heating transport belt at intervals, so that the electrode assembly with abnormal temperature can be found in time.

In some embodiments, multiple forming mechanisms are provided, and the multiple forming mechanisms are arranged close to the heating mechanism.

In the above solution, multiple forming mechanisms are integrated with the winding mechanism and the heating mechanism, to effectively reduce the volume of the electrode assembly manufacturing device, so the electrode assembly manufacturing device will not occupy a large space. The multiple forming mechanisms are arranged close to the heating mechanism, so that the distance between the multiple forming mechanisms and the heating mechanism is small, whereby the transport path of the electrode assembly is shortened, and the transport and manufacturing efficiency of the electrode assembly is improved.

In some embodiments, the electromagnetic heating assembly includes a protective cover and a heating module disposed in the protective cover. An inner wall of the protective cover is provided with a sound insulation layer, and the sound insulation layer is configured to insulate the noise generated when the electromagnetic heating assembly heats the electrode assembly.

In the above solution, the arrangement of the sound insulation layer on the inner wall of the protective cover of the electromagnetic heating assembly can reduce or insulate the noise generated when the electromagnetic heating assembly heats the electrode assembly, reduce the noise pollution, and avoid hearing damage to surrounding workers.

In some embodiments, an insulating layer is provided between the inner wall of the protective cover and the sound insulation layer, and the insulating layer is configured to limit the leakage of the current generated by the electromagnetic heating assembly to the outside of the protective cover.

In the above solution, the insulating layer is provided on the inner wall of the protective cover of the electromagnetic heating assembly, to reduce or limit the leakage of the current generated by the electromagnetic heating assembly to the outside of the protective cover, reduce the current pollution, and reduce the risk of electric shock of surrounding workers.

In some embodiments, the device further includes a sorting mechanism configured to classify and position the electrode assemblies, where the forming mechanism and the sorting mechanism are integrated.

In the above solution, the sorting mechanism is integrated into the electrode assembly manufacturing device, to effectively reduce the volume of the electrode assembly manufacturing device, so the electrode assembly manufacturing device will occupy a large space. In addition, the sorting mechanism and the forming mechanism are integrated, so that the distance between the sorting mechanism and the forming mechanism is small, and the electrode assemblies pressed-formed by the forming mechanism can quickly enter and be classified in the sorting mechanism, which improves the transport and classification efficiency of the electrode assemblies.

In the embodiment of the present application, the winding mechanism, the heating mechanism and the forming mechanism are integrated. On the one hand, the volume of the electrode assembly manufacturing device is effectively reduced, so it will not occupy a large space. On the other hand, the distance between the winding mechanism and the heating mechanism, and the distance between the heating mechanism and the forming mechanism are both reduced, so the transport path of the electrode assembly is shortened, thus improving the transport efficiency and manufacturing efficiency of the electrode assembly. In addition, a conveyor belt is provided between the heating mechanism and the winding mechanism, through which the electrode assembly can be directly transferred from the winding mechanism to the heating mechanism without the need for transfer by a mechanical gripper, so that the damage caused by the mechanical gripper to the electrode assembly is avoided, thus improving the quality of the electrode assembly.

The above description is merely summary of the technical solutions in the embodiments of the present application. For better understanding of the technical means provided in the embodiments of the present application, the technical means can be implemented according to the disclosure in the specification. Furthermore, to make the above and other objectives, features and advantages in the embodiments of the present application more comprehensible, specific implementations of the present application are exemplified below.

DESCRIPTION OF DRAWINGS

To describe the technical solutions in the embodiments of the present application more clearly, the accompanying drawings required for describing the embodiments will be described briefly below. Apparently, the accompanying drawings described below show only some embodiments of the present application, and other drawings can be obtained by a person of ordinary skill in the art from these accompanying drawings without creative efforts.

DESCRIPTION OF REFERENCE NUMERALS

Related art: 1: winding mechanism, 2: heating mechanism, 3: forming mechanism, 4: first loading machine, 5: first unloading machine, 6: logistics line, 7: second loading machine;

This application: 01: winding mechanism, 02: heating mechanism, 03: forming mechanism, 04: conveyor belt, 05: pre-pressing module, 06: code scanning module, 07: sorting mechanism, 011: electrode sheet unwinding shaft, 012: separator unwinding shaft, 013: automatic electrode sheet splicing module, 014: process correction module, 015: tension adjustment module, 016: electrode sheet cutting module, 017: feeding module, 018: winding head, 021: electromagnetic heating assembly, 022: heating transport belt.

DETAILED DESCRIPTION

To make the objects, technical solutions and advantages of the embodiments of the present application clearer, the technical solutions in the embodiments of the present application will be clearly and completely described below in conjunction with the drawings in the embodiments of the present application. Apparently, the described embodiments are some, rather than all embodiments of the present application. All other embodiments obtained by a person of ordinary skill in the art without creative efforts based on the embodiments of the present application shall fall within the protection scope of the present application.

Unless otherwise defined, all technical and scientific terms used herein have the same meaning as commonly understood by those skilled in the art belonging to the technical field of the present application. The terms used in the description of the present application are merely for the purpose of describing specific embodiments and are not intended to limit the present application.

The terms "including" and "having" and any variations thereof in the specification, claims, and the description of drawings of the present application are intended to cover non-exclusive inclusion. The word "a" or "an" does not exclude plural references.

Reference herein to "an embodiment" means that a particular feature, structure, or characteristic described in connection with the embodiment can be included in at least one embodiment of the present application. The appearance of this phrase "embodiment" anywhere in the specification does not necessarily refer to the same embodiment, or a separate or alternative embodiment that is mutually exclusive with other embodiments. It is explicitly and implicitly understood by those skilled in the art that the embodiments described herein may be combined with other embodiments.

In addition, the terms "first", "second" and the like in the specification and claims or the drawings of the present application are used to distinguish different objects, not to describe a specific order, and may explicitly or implicitly include one or more said features.

In the description of the embodiments of the present application, the term "a plurality of" refers to two or more (including two), and similarly, "multiple groups" refers to two or more (including two) groups.

In the description of the present application, it should be noted that, unless otherwise clearly specified and defined, the terms "mounting", "connection" and "connecting" should be interpreted in a broad sense. For example, "connection" or "connecting" of a mechanical structure may refer to a physical connection. For example, the physical connection may be fixed connection, such as fixed connection by a fastener, such as fixed connection by screws, bolts or other fasteners; the physical connection may also be detachable connection, such as snap-fit or clamping connection; and the physical connection may also be integral connection, for example, connecting by welding, bonding or integrally forming. For those of ordinary skill in the art, the specific meanings of the above terms in the present application may be understood according to specific circumstances.

The battery mentioned in the embodiments of the present application refers to a single physical module including one or more battery cells to provide a higher voltage and capacity.

A battery cell generally includes an electrode assembly, a case, and an end cover assembly. The end cover assembly is assembled with the case to form a closed space, and the electrode assembly is accommodated in the closed space. The electrode assembly is a core component of the battery cell to realize the charge and discharge function. The electrode assembly is generally wound with a positive electrode sheet, a negative electrode sheet and a separator, and the wound electrode assembly needs to be preheated and cold pressed to form a finished battery cell. Usually, the positive electrode sheet, the negative electrode sheet and the separator are wound by a winding mechanism 1, the wound electrode assembly is heated by a heating mechanism 2, and the electrode assembly is cold-pressed and formed by the forming mechanism 3.

Figure 1:
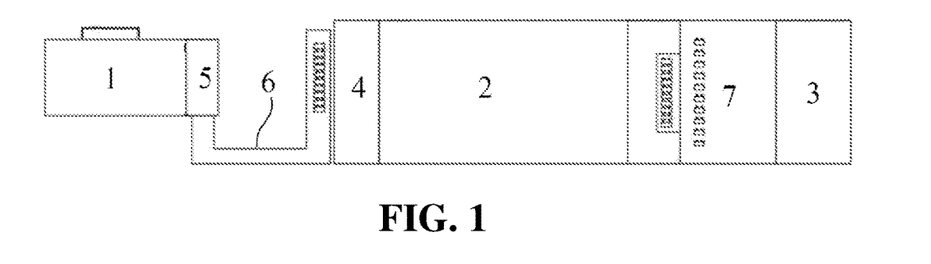
FIG. 1 is a schematic structural view of an electrode assembly manufacturing device provided in the related art.

FIG. 1 shows a schematic structural view of an electrode assembly manufacturing device in the related art. As shown in FIG. 1, the winding mechanism 1, the heating mechanism 2 and the forming mechanism 3 are arranged separately. An end of the winding mechanism 1 is provided with a first unloading machine 5, a front end of the heating mechanism 2 is provided with a first loading machine 4, and a longer logistics line 6 is provided between the first loading machine 4 and the first unloading machine 5. The end of the winding mechanism 1 refers to the end of the winding mechanism 1 close to the heating mechanism 2, and the front end of the heating mechanism 2 refers to the end of the heating mechanism 2 close to the winding mechanism 1.

The electrode assembly wound by the winding mechanism 1 is grabbed by a mechanical gripper, that is, a gripping jaw, of the first unloading machine 5, and then unloaded to the logistics line 6. The wound electrode assembly is transferred to the vicinity of the first loading machine 4 by the logistics line 6, and then a mechanical gripper of the first loading machine 4 grabs the electrode assembly on the logistics line 6 and transferred it to the heating mechanism 2 for heating. The heating mechanism 2 in the related art is generally a preheating tunnel furnace, which heats the electrode assembly by means of heat conduction.

A second loading machine 7 is arranged between the heating mechanism 2 and the forming mechanism 3. The electrode assembly heated by the heating mechanism 2 is grabbed by a mechanical gripper of the second loading machine 7 and transferred to the forming mechanism 3 for cold pressing and forming to obtain a compacted electrode assembly.

In the related art, since the winding mechanism 1, the heating mechanism 2 and the forming mechanism 3 are arranged separately, the distance between various mechanisms is large, and a longer logistics line 6 needs to be provided between the winding mechanism 1 and the heating mechanism 2 for transport of the electrode assembly, causing a large volume of and thus a large space occupied by the electrode assembly manufacturing device. Moreover, due to the large distance between various mechanisms, the transport path of the electrode assembly is long, and the transport and manufacturing efficiency of the electrode assembly is low. In addition, the electrode assembly wound by the winding mechanism 1 cannot travel directly from the winding mechanism 1 to the heating mechanism 2, instead the electrode assembly needs to be grabbed from the end of the winding mechanism 1 by a mechanical gripper and transferred to the front end of the heating mechanism 2. On the one hand, the transport efficiency of the electrode assembly is reduced. On the other hand, when the mechanical gripper grabs the electrode assembly, it is in partial contact with the electrode assembly, and the distance between the separator and the positive and negative electrode sheets at the contact site will change, so that the electrode assembly has a low consistency in various sites after heating. Moreover, there is a risk of damaging the electrode assembly when the mechanical gripper grabs the electrode assembly, so the quality of the electrode assembly cannot be guaranteed. Furthermore, the electrode assembly is heated by heat conduction, and the heating efficiency is low, which affects the manufacturing efficiency of the electrode assembly.

Figure 2:
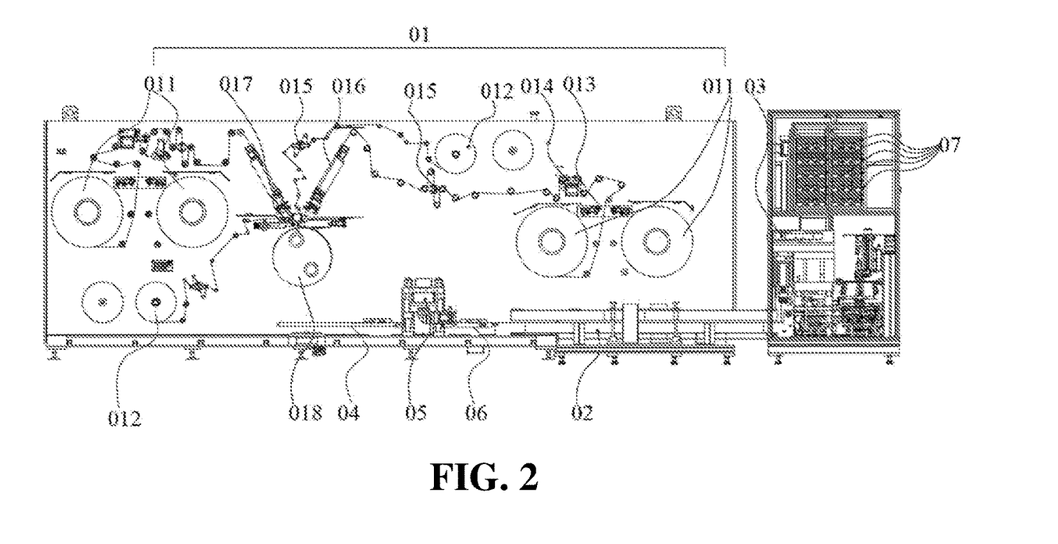
FIG. 2 is a schematic structural view of an electrode assembly manufacturing device provided in an embodiment of the present application.

In view of this, an embodiment of the present application provides an electrode assembly manufacturing device, which integrates a winding mechanism 01, a heating mechanism 02 and a forming mechanism 03 to effectively reduce the volume of the electrode assembly manufacturing device. After integration, the distance between the winding mechanism 01 and the heating mechanism 02, and the distance between the heating mechanism 02 and the forming mechanism 03 are both reduced, so the transport path of the electrode assembly is shortened, thus improving the transport and manufacturing efficiency of the electrode assembly. In the present application, a conveyor belt 04 is provided between the heating mechanism 02 and the winding mechanism 01, through which conveyor belt 04 the electrode assembly can be directly transferred from the winding mechanism to 01 the heating mechanism 02 without the need for transfer by a mechanical gripper, so that the damage caused by the mechanical gripper to the electrode assembly is avoided, thus improving the quality of the electrode assembly.

Compared with the related art, the overall length of the electrode assembly manufacturing device provided in the embodiment of the present application is saved by about 14%. From the winding mechanism 01 to the heating mechanism 02, and then to the forming mechanism 03, the electrode assembly needs to be grabbed by the mechanical gripper in the related art, and the number of times to grab the electrode assembly is 3. In the present application, a mechanical gripper is needed to grab the electrode assembly only from the heating mechanism 02 to the forming mechanism 03, and the number of times to grab the electrode assembly is 1. It can be seen that compared with the related art, the number of times the mechanical gripper grabs the electrode assembly is reduced in the present application, thus effectively reducing the damage to the electrode assembly by the mechanical gripper.

The electrode assembly manufacturing device disclosed in the embodiments of the present application can be used to manufacture an electrode assembly of a battery. The battery can be used in, without limitation, a powered device such as a vehicle, a ship, or an aircraft, to provide power for the powered device. In embodiment of the present application, the powered device may be, but is not limited to, a mobile phone, a tablet, a laptop, an electric toy, an electric tool, a battery vehicle, an electric vehicle, a ship, a spacecraft, and so on. The electric toy may include fixed or mobile electric toys, such as game consoles, electric car toys, electric ship toys, electric airplane toys, and the like. The spacecraft may include airplanes, rockets, space shuttles, spaceships, and the like.

The electrode assembly manufacturing device disclosed in the embodiments of the present application will be described in detail below in conjunction with the accompanying drawings. FIG. 2 is a schematic structural view of an electrode assembly manufacturing device provided in an embodiment of the present application. As shown in FIG. 2, the device includes a winding mechanism 01, a heating mechanism 02 and a forming mechanism 03. The winding mechanism 01 is configured to wind a positive electrode sheet, a separator and a negative electrode sheet into an electrode assembly. A conveyor belt 04 is arranged between the heating mechanism 02 and the winding mechanism 01, where the conveyor belt 04 is configured to transfer the electrode assembly from the winding mechanism 01 to the heating mechanism 02, and the heating mechanism 02 is configured to heat the electrode assembly. The forming mechanism 03 is configured to press and form the electrode assembly.

The winding mechanism 01 includes an electrode sheet unwinding shaft 011, a separator unwinding shaft 012, an automatic electrode sheet splicing module 013, a process correction module 014, a tension adjustment module 015, an electrode sheet cutting module 016, a feeding module 017, a separator cutting module, and a winding head 018 etc.

For example, the electrode sheet unwinding shaft 011 is configured to unwind the electrode sheet under the control of a servo motor, and the separator unwinding shaft 012 is configured to unwind the separator under the control of the servo motor. One or more sets of electrode sheet unwinding shafts 011 can be provided, and each set of electrode sheet unwinding shaft 011 includes a positive electrode sheet unwinding shaft for unwinding the positive electrode sheet and a negative electrode sheet unwinding shaft for unwinding the negative electrode sheet. One or more sets of separator unwinding shafts 012 can be provided, and each set of separator unwinding shaft 012 includes an upper separator unwinding shaft 012 and a lower separator unwinding shaft 012. If multiple sets of electrode sheet unwinding shafts 011 and separator unwinding shafts 012 are provided, when the winding mechanism 01 works normally, one set of electrode sheet unwinding shaft 011 in the multiple sets of electrode sheet unwinding shafts 011 and one set of separator unwinding shaft 012 in the multiple sets of separator unwinding shafts 012 works, and the other sets of electrode sheet unwinding reels 011 and the other sets of separator unwinding reels 012 stand by. When the set of working electrode sheet unwinding shaft 011 is abnormal, the standby electrode sheet unwinding shafts 011 can be used, and when the set of working separator unwinding shaft 012 is abnormal, the standby separator unwinding shafts 012 can be used.

The winding head 018 is driven by the servo motor to wind the positive electrode sheet, the negative electrode sheet and the separator.

The automatic electrode sheet splicing module 013, the process correction module 014, the tension adjustment module 015, the electrode sheet cutting module 016, and the feeding module 017 are all arranged between the electrode sheet unwinding shaft 011 and the winding head 018. The automatic electrode sheet splicing module 013 includes an automatic positive electrode sheet splicing module 013 and an automatic negative electrode sheet splicing module 013. The automatic positive electrode sheet splicing module 013 is configured for automatic electrode sheet roll change and connection when the positive electrode sheet roll is changed. The automatic negative electrode sheet splicing module 013 is configured for automatic electrode sheet roll change and connection when the negative electrode sheet roll is changed.

The process correction module 014 and the tension adjustment module 015 are arranged in a strip running area of the positive electrode sheet and a strip running area of the negative electrode sheet. The process correction module 014 is configured for process correction of the positive electrode sheet and the negative electrode sheet in the middle strip running area by serpentine correction. The tension adjustment module 015 is configured to adjust the tension of the positive electrode sheet in the middle strip running area of the positive electrode sheet and adjust the tension of the negative electrode sheet in the middle strip running area of the negative electrode sheet.

The electrode sheet cutting module 016 includes a positive electrode sheet cutting module and a negative electrode sheet cutting module. The positive electrode sheet cutting module is configured to cut the positive electrode sheet at a division of the positive electrode sheet of a previous electrode assembly and a positive electrode sheet of a next electrode assembly. The negative electrode sheet cutting module is configured to cut the negative electrode sheet at a division of the negative electrode sheet of a previous electrode assembly and a negative electrode sheet of a next electrode assembly.

The feeding module 017 includes a positive electrode sheet feeding module and a negative electrode sheet feeding module. The positive electrode sheet feeding module is arranged between the positive electrode sheet cutting module and the winding head 018, and configured to feed a next positive electrode sheet to the winding head 018 after the positive electrode sheet is cut. The negative electrode sheet feeding module is arranged between the negative electrode sheet cutting module and the winding head 018, and configured to feed a next negative electrode sheet to the winding head 018 after the negative electrode sheet is cut.

The separator cutting module is arranged between the separator unwinding shaft 012 and the winding head 018, and configured to cut the separator.

The heating mechanism 02 is arranged between the winding mechanism 01 and the forming mechanism 03. A conveyor belt 04 is provided between the heating mechanism 02 and the winding mechanism 01, and the conveyor belt 04 serves as a direct bridge between the heating mechanism 02 and the winding mechanism 01, allowing the electrode assembly wound by the winding mechanism 01 to travel directly to the conveyor belt 04. Then, the electrode assembly is transferred by the conveyor belt 04, to travel directly from the conveyor belt 04 to the heating mechanism 02 for heating. Since the electrode assembly can travel directly from the winding mechanism 01 via the conveyor belt 04 to the heating mechanism 02, there is no need to provide an additional unloading machine at the end of the winding mechanism 01 and a loading machine at the front end of the heating mechanism 02, and there are no need for unloading by a mechanical gripper of the unloading machine from the winding mechanism 01 and loading to the heating mechanism 02 by a mechanical gripper of the loading machine. In this way, the transport efficiency of the electrode assembly can be improved while simplifying the structure of the electrode assembly manufacturing device. Moreover, without grabbing the electrode assembly by the mechanical gripper, damage to the electrode assembly by the mechanical gripper can be avoided, thus improving the quality of the electrode assembly.

An unloading machine can be provided at the end of the heating mechanism 02, and a loading machine can be provided at the front end of the forming mechanism 03. The unloading machine can grab and transfer the electrode assembly heated by the heating mechanism 02 to the forming mechanism 03, and then the electrode assembly is cold pressed and formed by the forming mechanism 03 to compact the electrode assembly.

In the above embodiment, a conveyor belt 04 is provided between the heating mechanism 02 and the winding mechanism 01, through which conveyor belt 04 the electrode assembly can be directly transferred from the winding mechanism 01 to the heating mechanism 02 without the need for transfer by a mechanical gripper, so that the damage caused by the mechanical gripper to the electrode assembly is avoided, thus improving the quality of the electrode assembly.

Figure 3:
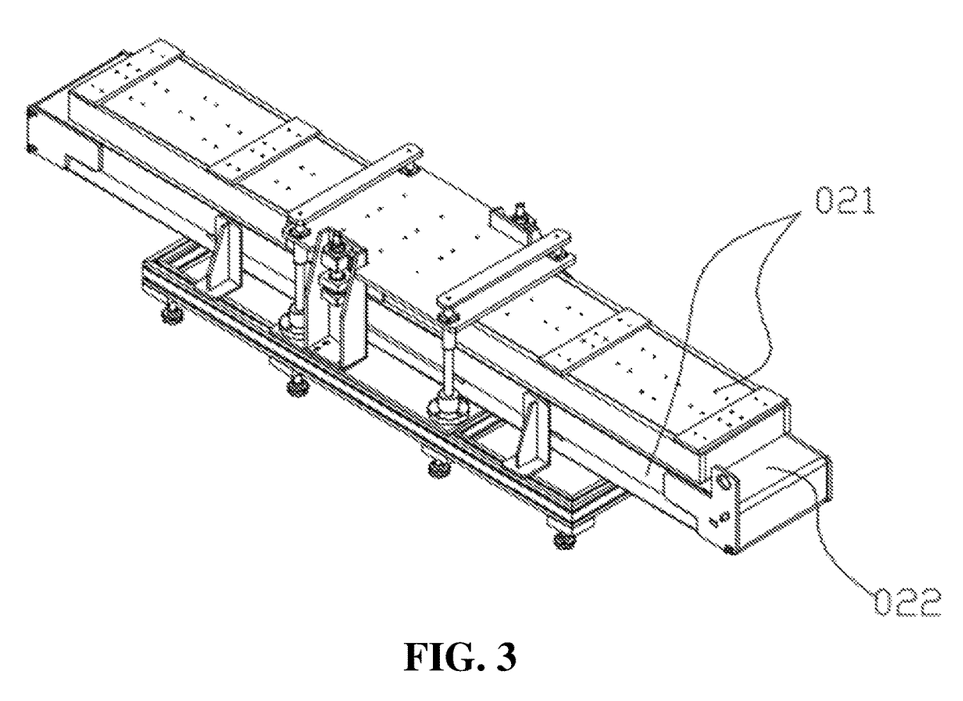
FIG. 3 is a schematic structural view of a heating mechanism provided in an embodiment of the present application.

In some embodiments, as shown in FIG. 3, the heating mechanism 02 includes two oppositely disposed electromagnetic heating assemblies 021. A gap for the electrode assembly to pass through is provided between the two electromagnetic heating assemblies 021. The electromagnetic heating assembly 021 is configured to electromagnetically heat the electrode assembly.

The gap refers to the distance between two electromagnetic heating assemblies 021, and the size of the gap can be set according to the size of the electrode assembly. The position of one electromagnetic heating assembly 021 of the two electromagnetic heating assemblies 021 can be adjusted. Specifically, it can be adjusted toward or away from the other electromagnetic heating assembly 021, whereby the distance between the two electromagnetic heating assemblies 021 can be changed.

The electromagnetic heating assembly 021 can emit electromagnetic waves and irradiate the electrode assembly, so as to heat the electrode assembly in the gap between the two electromagnetic heating assemblies 021. The electromagnetic heating assembly 021 can be heated to a high temperature in a short time, so the electrode assembly can be heated rapidly in a short time.

It can be understood that there may be multiple electrode assemblies in the gap between the two electromagnetic heating assemblies 021. When the electrode assembly passes through the gap between the two electromagnetic heating assemblies 021, each electromagnetic heating assembly 021 can heat the electrode assembly, so as to improve the effect of subsequent pressing and forming.

Since the electrode assembly is located in the gap between two opposite electromagnetic heating assemblies 021, the electrode assembly can be heated quickly and sufficiently by the two electromagnetic heating assemblies 021, which can improve the tightness of the bonding between the positive electrode sheet, the separator, and the negative electrode sheet in the electrode assembly, and ensure the consistency of the battery.

In some embodiments, as shown in FIG. 3, the heating mechanism 02 further includes a heating transport belt 022, which is connected to the conveyor belt 04 and configured to transport the electrode assembly in the heating mechanism 02.

Because the heating mechanism 02 itself has a heating transport belt 022, it is possible to directly join the heating transport belt 022 in the heating mechanism 02 to the conveyor belt 04 without additionally connecting a transport belt or transferring the electrode assembly by a mechanical gripper. While improving the transport efficiency of the electrode assembly, the electrode assembly will not be damaged, thereby ensuring the quality of the electrode assembly. The heating transport belt 022 and the conveyor belt 04 are driven to move by different power mechanisms, and the joining of the heating transport belt 022 and the conveyor belt 04 means that the heating transport belt 022 and the conveyor belt 04 abut along the transport direction, or the heating transport belt 022 is in close contact with the conveyor belt 04 along the transport direction. In this way, the electrode assembly will not fall when the conveyor belt 04 transfers the electrode assembly to the joint with the heating transport belt 022. Instead, the front half of the electrode assembly can be smoothly placed on the heating transport belt 022, and the rear half of the electrode assembly remains on the conveyor belt 04. As the conveyor belt 04 and the heating transport belt 022 continue to move, the entire electrode assembly can be transferred to the heating transport belt 022, and the electrode assembly is transported by the heating transport belt 022 in the heating mechanism 02. The front half of the electrode assembly is the portion of the electrode assembly close to the heating mechanism 02, and the rear half of the electrode assembly is the portion of the electrode assembly close to the winding mechanism 01.

The heating transport belt 022 can be arranged in the gap between the two electromagnetic heating assemblies 021 opposite to each other. When the electrode assembly is driven by the heating transport belt 022 to pass through the gap between the two electromagnetic heating assemblies 021, it can be heated quickly by the electromagnetic heating assemblies 021. Generally, during mass production, the heating transport belt 022 transports multiple electrode assemblies at a time. In order to improve the heating efficiency of the electrode assembly and the heating effect on the electrode assembly, the multiple electrode assemblies can be distributed at intervals on the heating transport belt 022 between the two electromagnetic heating assemblies 021, so that multiple surfaces of the electrode assembly can receive the heat released by the electromagnetic heating assemblies 021, thereby improving the heating efficiency of the electrode assembly.

The heating transport belt 022 in the heating mechanism 02 is joined to the conveyor belt 04, and the electrode assembly heated by the heating mechanism 02 can directly travel from the conveyor belt 04 to the heating transport belt 022, and then the electrode assembly is transported in the heating mechanism 02 by the heating transport belt 022. The electrode assembly can be heated during the transport process in the heating mechanism 02, and the heating efficiency is high.

In some embodiments, the heating transport belt 022 runs at the same speed as the conveyor belt 04.

The heating transport belt 022 and the conveyor belt 04 are driven to move by different power mechanisms, and the driving force provided by the power mechanism driving the heating transport belt 022 can be the same as that provided by the power mechanism driving the conveyor belt 04. As a result, the heating transport belt 022 can move at the same speed as the conveyor belt 04. Therefore, the electrode assembly heated by the heating mechanism 02 can travel smoothly from the conveyor belt 04 to the heating transport belt 022, to prevent the stagnation or overturn of the electrode assembly when traveling from the conveyor belt 04 to the heating transport belt 022.

The temperature of the electrode assembly gradually rises when transported on the heating transport belt 022. To get to know the current temperature of the electrode assembly in time, in some embodiments, the heating transport belt 022 is provided with a temperature sensor configured to sense the temperature of the electrode assembly on the heating transport belt 022.

Exemplarily, the electrode assembly manufacturing device may further include a controller, communicating with the temperature sensor. After the temperature sensor senses the temperature of the electrode assembly on the heating transport belt 022, it can transmit the sensed temperature to the controller. In some embodiments, the controller may have a display panel, and the controller may display the received temperature for viewing by the staff. In some embodiments, a temperature threshold for the electrode assembly can be preset in the controller, and the controller can compare the received temperature with the temperature threshold, and alarm when the received temperature is determined to be greater than or equal to the temperature threshold. Therefore, the personnel can find the electrode assembly with abnormal temperature in time and deal with it accordingly. The temperature threshold may be any value between 70° C. and 100° C. The treatment method for the electrode assembly with abnormal temperature can be shutdown and removal to ensure the safety, and of course other treatment methods can also be included, which is not limited in the embodiment of the present application.

By arranging a temperature sensor on the heating transport belt 022, the temperature of the electrode assembly on the heating transport belt 022 can be sensed, so as to get to know the temperature of the electrode assembly in time.

In some embodiments, as shown in FIG. 3, multiple temperature sensors are provided, and the multiple temperature sensors are distributed on the heating transport belt 022 at intervals.

In some cases, the multiple temperature sensors can be evenly distributed on the heating transport belt 022, and the heating rate of the electrode assembly can be known through the temperature sensed by the multiple temperature sensors. In other cases, the temperature of the electrode assembly gradually rises when transported on the heating transport belt 022. The temperature of the electrode assembly near the front end of the heating mechanism 02 on the heating transport belt 022 is relatively low, and the temperature of the electrode assembly near the end of the heating mechanism 02 is relatively high. It can be seen that the closer to the end of the heating mechanism 02, the easier it is for the electrode assembly to have abnormal temperature. To facilitate timely detection of electrode assemblies with abnormal temperatures, a smaller number of temperature sensors can be arranged on the heating transport belt 022 near the front end of the heating mechanism 02, and a larger number of temperature sensors can be arranged on the heating transport belt 022 near the end of the heating mechanism 02.

The temperature sensors are distributed at different positions on the heating transport belt 022 at intervals, so that the electrode assembly with abnormal temperature can be found in time.

In some embodiments, multiple forming mechanisms 03 are provided, and the multiple forming mechanisms are 03 arranged close to the heating mechanism 02.

Pressing and forming is a procedure after heating. Therefore, the forming mechanism 03 can be arranged after the heating mechanism 02, and close to the heating mechanism 02. In this way, the distance between the forming mechanism 03 and the heating mechanism 02 is small, to shorten the transport path of the electrode assembly and improve the transport efficiency and manufacturing efficiency of the electrode assembly.

The winding mechanism 01 and the heating mechanism 02 both employ flow line operations, and the heating mechanism 02 can continuously heat the electrode assembly, that is to say, the number of heated electrode assemblies is relatively large. In order to improve the forming efficiency of the electrode assembly, multiple forming mechanisms 03 can be provided.

The multiple forming mechanisms 03 are integrated with the winding mechanism 01 and the heating mechanism 02, to effectively reduce the volume of the electrode assembly manufacturing device, so the electrode assembly manufacturing device will not occupy a large space. The multiple forming mechanisms 03 are arranged close to the heating mechanism 02, so that the distance between the multiple forming mechanisms 03 and the heating mechanism 02 is small, whereby the transport path of the electrode assembly is shortened, and the transport and manufacturing efficiency of the electrode assembly is improved.

In some embodiments, large noise will be produced when the electrode assembly is electromagnetically heated. To reduce the noise pollution, the electromagnetic heating assembly 021 includes a protective cover and a heating module disposed in the protective cover. An inner wall of the protective cover is provided with a sound insulation layer, and the sound insulation layer is configured to insulate the noise generated when the electromagnetic heating assembly 021 heats the electrode assembly.

The protective cover can be a square shell structure, the heating module can be a heating coil, and the protective cover is arranged outside the heating module, to protect the heating module to a certain extent.

In some embodiments, the sound insulation layer can be a sound insulation material coated or a sound insulation member fixed on the inner wall of the protective cover, for example, it can be solid bricks, wood boards, plaster boards, iron plates, sound insulation felts, fiber boards and the like. In some other embodiments, the sound insulation layer can also be a sound-absorbing material coated or a sound-absorbing member fixed on the inner wall of the protective cover, for example, it can be organic fiber, inorganic fiber, inorganic foam, and foam plastic, etc. The material of the sound insulation layer is not limited in the embodiment of the present application as long as the noise generated during electromagnetic heating can be reduced or eliminated.

The sound insulation layer may cover the entire inner wall of the protective cover, and of course, the sound insulation layer may be provided only on a part of the inner wall of the protective cover, which is not limited in the embodiment of the present application.

The arrangement of the sound insulation layer on the inner wall of the protective cover of the electromagnetic heating assembly 021 can reduce or insulate the noise generated when the electromagnetic heating assembly heats the electrode assembly, reduce the noise pollution, and avoid hearing damage to surrounding workers.

In some embodiments, a large current is generated when the electrode assembly is electromagnetically heated. To reduce the possibility of leakage of the current, an insulating layer is provided between the inner wall of the protective cover and the sound insulation layer, and the insulating layer is configured to limit the leakage of current generated by the electromagnetic heating assembly 021 to the outside of the protective cover.

The insulating layer can be an insulating material coated or an insulating member fixed between the inner wall of the protective cover and the sound insulation layer, for example, it can be insulating varnish, insulating glue, mica, asbestos and the like. The material of the insulating member is not limited in the embodiment of the present application as long as it can exert a certain insulating effect.

It is to be noted that in the absence of the sound insulation layer, the insulating layer can also be directly arranged on the inner wall of the protective cover in the present application. That is, the arrangement of the insulating layer does not depend on the sound insulation layer. Similar to the sound insulation layer, the insulating layer can cover the entire inner wall of the protective cover, and of course, the insulating layer can only be provided on a part of the inner wall of the protective cover, or only provided between the inner wall of a part of the protective cover and the sound insulation layer, which is not limited in the embodiment of the present application.

The arrangement of the insulating layer on the inner wall of the protective cover of the electromagnetic heating assembly 021 can reduce or limit the leakage of current generated by the electromagnetic heating assembly 021 to the outside of the protective cover, reduce the current pollution, and reduce the risk of electric shock of surrounding workers.

In some embodiments, as shown in FIG. 1, the electrode assembly manufacturing device provided in the embodiment of the present application further includes a sorting mechanism 07, configured to classify and position the electrode assemblies, where the forming mechanism 03 and the sorting mechanism 07 are integrated.

The sorting mechanism 07 can classify the electrode assemblies formed by the forming mechanism 03, for example, the electrode assemblies can be classified into qualified, unqualified, and reworkable. Qualified means that all indicators meet the requirements after the pressing and forming. Unqualified means that the key indicators after the pressing and forming do not meet the requirements, and cannot become qualified through post-processing. Reworkable means that some indicators after flowing out of the forming mechanism 03 do not meet the requirements, but some processing can be done to make them qualified. For example, the temperature of an electrode assembly is too high after forming, but the temperature is not excessively high. Natural cooling or assisted cooling can be carried out to make the temperature reach the standard, so as to meet the requirements of qualified products. After the electrode assemblies are classified, they are positioned differentially and labeled in different categories of deployment areas for subsequent use.

The sorting mechanism 07 and the forming mechanism 03 are integrated, so that the distance between the sorting mechanism 07 and the forming mechanism 03 is small, and the electrode assemblies pressed and formed by the forming mechanism 03 can quickly enter and be classified in the sorting mechanism 07, which improves the classification efficiency of the electrode assemblies. In addition, the integration of the sorting mechanism 07 and the forming mechanism 03 saves the space occupied by the device.

In some embodiments, the electrode assembly manufacturing device provided in the embodiment of the present application may further include an adhesive applying module, a pre-pressing module 05, a code scanning module 06 and the like. When the electrode assembly is manufactured by the electrode assembly manufacturing device provided in the embodiment of the present application, as shown in FIG. 1, an electrode sheet unwinding shaft 011 on the left and right sides and a separator unwinding shaft 012 on the left and right sides start to unwind, and the unwound electrode sheet and separator are adjusted by the process correction module 014 and the tension adjustment module 015, and wound after reaching the winding head 018. After an appropriate length is wound, the electrode sheet cutting module 016 cuts off the electrode sheet, and the separator cutting module cuts off the separator to obtain a coiled and formed electrode assembly. After an adhesive is applied by the adhesive applying module, the pre-pressing module 05 pre-presses the electrode assembly, the code scanning module 06 reads the code of the electrode assembly, the heating mechanism 02 heats the electrode assembly, the forming mechanism 03 presses and forms the electrode assembly, and the sorting mechanism 07 classifies and differentially positions the electrode assemblies.

In summary, the winding mechanism 01, the heating mechanism 02 and the forming mechanism 03 are integrated. On the one hand, the volume of the electrode assembly manufacturing device is effectively reduced, so it will not occupy a large space. On the other hand, the distance between the winding mechanism 01 and the heating mechanism 02 and the distance between the heating mechanism 02 and the forming mechanism 03 are both reduced, so the transport path of the electrode assembly is shortened, thus improving the transport efficiency and manufacturing efficiency of the electrode assembly. In addition, the conveyor belt 04 is provided between the heating mechanism 02 and the winding mechanism 01, through which conveyor belt 04 the electrode assembly can be directly transferred from the winding mechanism 01 to the heating mechanism 02 without the need for transfer by a mechanical gripper, so that the damage caused by the mechanical gripper to the electrode assembly is avoided, thus improving the quality of the electrode assembly.

It will be understood by those skilled in the art that although some of the embodiments herein include some, but not other features included in other embodiments, combinations of features of different embodiments are intended to be embraced in the scope of the present application and form different embodiments. For example, in the claims, any of the claimed embodiments may be used in any combination.

The above embodiments are merely used for illustrating rather than limiting the technical solutions of the present application. Although the present application has been described in detail with reference to the above various embodiments, those of ordinary skill in the art should understand that the technical solutions described in the above various embodiments can be modified, or some of the technical features therein can be equivalently substituted. However, such modifications or substitutions do not make the essence of the corresponding technical solutions depart from the spirit and scope of the technical solutions of the various embodiments of the present application.

What is claimed is:

1. An electrode assembly manufacturing device, comprising:
    a winding mechanism, configured to wind a positive electrode sheet, a separator, and a negative electrode sheet into an electrode assembly;
    a heating mechanism;
    a conveyor belt arranged between the heating mechanism and the winding mechanism, and disposed outside the heating mechanism;
    a power mechanism configured to drive the conveyor belt to move to transfer the electrode assembly from the winding mechanism to the heating mechanism, wherein the heating mechanism is configured to heat the electrode assembly; and
    a forming mechanism, configured to press and form the electrode assembly;
    wherein the heating mechanism comprises a heating transport belt, and the heating transport belt is joined to the conveyor belt and is configured to move in a direction from a first side of the heating mechanism to a second side of the heating mechanism to transport the electrode assembly from the first side of the heating mechanism to the second side of the heating mechanism.

2. The electrode assembly manufacturing device according to claim 1, wherein the heating mechanism further comprises two oppositely arranged electromagnetic heating assemblies, a gap for the electrode assembly to pass through is provided between the two electromagnetic heating assemblies, and the electromagnetic heating assembly is configured to electromagnetically heat the electrode assembly.

3. The electrode assembly manufacturing device according to claim 2, wherein each of the two electromagnetic heating assemblies comprises a protective cover and a heating module arranged in the protective cover, and an inner wall of the protective cover is provided with a sound insulation layer configured to insulate noise generated when the electromagnetic heating assembly heats the electrode assembly.

4. The electrode assembly manufacturing device according to claim 3, wherein an insulating layer is provided between the inner wall of the protective cover and the sound insulation layer, and the insulating layer is configured to limit a leakage of current generated by the electromagnetic heating assembly to an outside of the protective cover.

5. The electrode assembly manufacturing device according to claim 1, wherein the heating transport belt is configured to run at a same speed as the conveyor belt.

6. The electrode assembly manufacturing device according to claim 1, wherein the heating transport belt is provided with a temperature sensor configured to sense a temperature of the electrode assembly on the heating transport belt.

7. The electrode assembly manufacturing device according to claim 6, wherein the temperature sensor is one of a plurality of temperature sensors, and the plurality of temperature sensors are distributed on the heating transport belt at intervals.

8. The electrode assembly manufacturing device according to claim 1, wherein the forming mechanism is one of a plurality of forming mechanisms, and the plurality of forming mechanisms are arranged close to the heating mechanism.

9. The electrode assembly manufacturing device according to claim 1, further comprising:
    a sorting mechanism configured to classify and position the electrode assembly;
    wherein the forming mechanism is integrated with the sorting mechanism.

10. The electrode assembly manufacturing device according to claim 1, wherein:
    the conveyor belt abuts or contacts the heating transport belt along a transport direction.

* * * * *